ABSTRACT OF THE DISCLOSURE

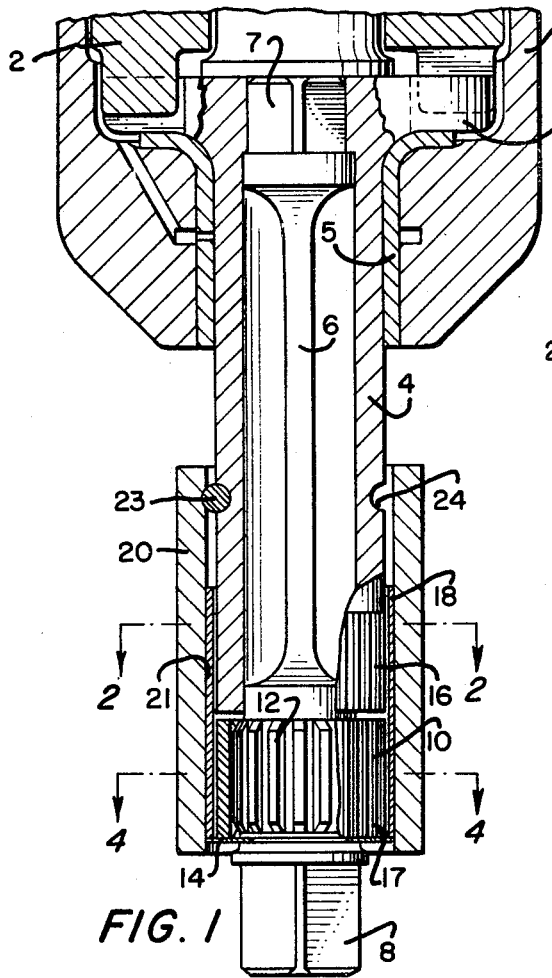
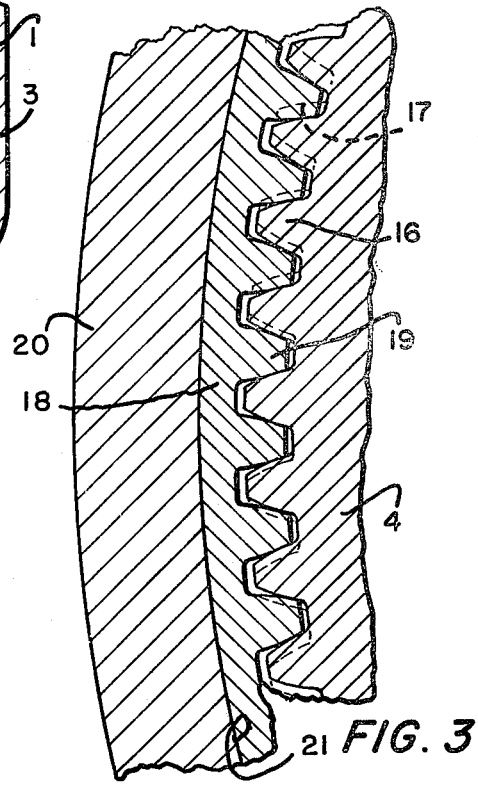
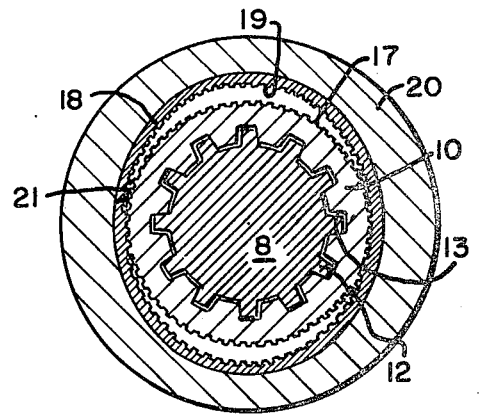
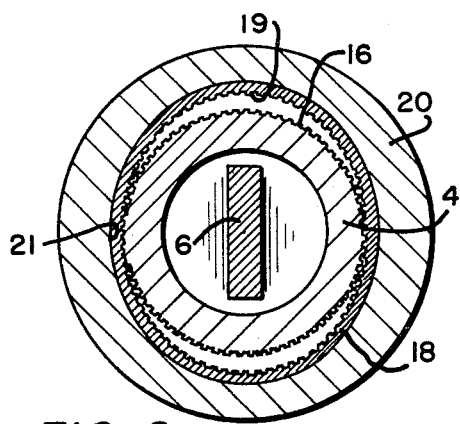
FIG. 1
FIG. 3
FIG. 4
FIG. 2
INVENTOR.
REGINALD W. PAULEY 3,392,793
IMPACT TOOL TORQUE LIMITING CONTROL
Reginald W. Pauley, Belle Mead, N.J., assignor to Ingersoll-Rand Company, New York, N.Y., a corporation of New Jersey
Filed Mar. 29, 1967, Ser. No. 626,840
2 Claims. (Cl. 173—93.7)

A rotary impact tool or wrench containing a torque limiting meachnism including a prestressed torsion bar spring and having an adjustment means which is operable by hand for winding the torsion bar to its prestressed load. This adjustment means includes a pair of axially aligned external gear teeth sets having a slightly different number of teeth and coupled by a flexible bushing surrounding the external gear teeth and containing a set of internal gear teeth. The flexible bushing is rotatably mounted in a sleeve having a smooth elliptical or noncircular bore which deforms the bushing into a noncircular shape wherein the meshing of its internal gear teeth with the external gear teeth is limited to a portion of its circumference.

Background of invention

This invention relates to rotary impact tools having a torque limiting means which can be adjusted to vary the maximum magnitude or amount of torque applicable by such tools to a workpiece, such as a nut or the like.

A conventional rotary impact tool having an adjustable torque limiting means is disclosed in the U.S. Patent No. 2,822,677, issued Feb. 11, 1958 to H. C. Reynolds. This tool includes an axially extending torsion bar spring which is utilized to transmit rotary impacts to a workpiece. The torsion spring is wound or prestressed to a predetermined value of torque corresponding to the maximum torque load that is to be transmitted by the torsion spring to a workpiece. By being prestressed, the torsion spring transmits torque loads as a rigid non-deflecting coupling so long as the transmitted torque is equal to or less than the prestressed torque of the torsion spring. When the impact torque load applied to the torsion spring by the rotary impact tool exceeds the prestressed torque of the torsion spring, the torsion spring begins acting as a spring, instead of a rigid coupling, and deflects an additional amount and then rebounds to absorb and dissipate the excessive impact torque load without transmitting it to the workpiece.

The above described arrangement does a fine job in limiting the maximum torque output of a rotary impact tool. However, its attractiveness is lessened by the fact that the torsion spring is difficult to adjust to selected values of prestressed torque and such adjustment requires a special jig or other complicated apparatus. It also adjusts torque only in stepped increments, rather than continuously.

Summary of invention

The principal object of this invention is to overcome and substantially eliminate the problems present in the above described conventional torque limiting means and to provide an impact tool torque limiting arrangement which can be readily and simply adjusted without utilizing special jigs or similar types of devices.

Further important objects are: to provide a rotary impact tool of the prestressed torsion spring type which can be readily adjusted by use of the hands, without the use of tools; and to provide an adjustment means for a rotary impact tool of the prestressed torsion spring type which is convenient to use, compact in size and weight, relatively economical to manufacture and applies a radially balanced torque load on the prestressed torsion spring.

In general, these objects are attained by coupling the torsion spring to the tool anvil by a gear mechanism including two sets of external gear teeth, providing a flexible bushing containing a set of internal gear teeth surrounding and engaging both sets of external gear teeth to form two groups of interengaged gear teeth, and rotatively enclosing the bushing in a noncircular sleeve which deforms the bushing to a non-circular shape so that the meshing of its internal teeth with the external teeth is limited to a portion of the bushing circumference. The number of teeth of the two groups of interengaged teeth is made slightly different so that the turning of the sleeve will cause one set of external gear teeth to be rotated relative to the other set of external gear teeth as the noncircular sleeve is rotated around the bushing, causing the meshed portion of the bushing to progressively mesh with the external gear teeth.

Brief description of the drawings

The invention is described in connection with the accompanying drawings wherein:

FIG. 1 is a fragmentary axial section of the front end portion of a rotary impact tool incorporating this invention;

FIG. 2 is an enlarged section taken on line 2—2 of FIG. 1;

FIG. 3 is a fragmentary enlarged portion of FIG. 2 and illustrating the operation of the adjustment mechanism; and FIG. 4 is an enlarged section taken on line 4—4 of FIG. 1.

Description of preferred embodiment

The rotary impact tool shown in the drawing includes an outer housing or casing 1 containing a rotary motor (not shown) driving a rotary hammer 2 which, as it rotates, periodically strikes an impact or blow to a rotary anvil 3. The anvil 3 includes an integral forwardly extending tube 4 journaled in a bearing 5 mounted in the front end of the impact tool housing 1. The tube 4 of the anvil surrounds an elongated torsion spring or bar 6 having its rear end 7 formed as a square plug nonrotationally fixed in a corresponding square hole in the anvil 3, so that the impacts received by the anvil 3 from the hammer 2 are rigidly coupled to the upper end of the torsion spring 6.

The forward end 8 of the torsion spring 6 is adapted to engage a workpiece, such as a nut or bolt head. This engagement is accomplished by means of a socket (not shown) having a square hole for detachably receiving the square forward drive end 8 of the spring 6. The foregoing structure is conventional in the rotary impact tool art.

The impact energy received by the anvil 3 is transmitted substantially by the torsion spring 6 to a workpiece. (Some theories hold that a portion of the torque is transmitted by the tube 4.) In order for the spring 6 to transmit torque efficiently, it must be wound or prestressed under a torque which is equal to or greater than the torque of the impacts being transmitted. Once the spring 6 is wound under a given torque load, it acts as a rigid coupling in transmitting torque loads which are equal to or less than the prestressing torque of the spring. In other words, so long as the torque loads applied to the torsion spring 6 do not exceed its prestressed torque, no further deflection of the spring 6 occurs.

The torque load applied by the anvil 3 to the torsion spring 6 is determined by the resistance of the workpiece to a rotary movement. If the workpiece is free to turn under low values of torque, the torque load on the torsion spring 6 is low. As the resistance of the workpiece to rotary movement increases, as it is tightened, the torque loads on the torsion spring 6 progressively rise in a corresponding manner until either reaching the maximum impact torque applicable by the hammer 2 to the anvil 3, or exceeding the prestressed torque of the torsion spring 6.

When the impact torque load applied to the torsion spring 6 exceeds its prestressing torque, the spring 6 deflects or winds up additionally under each impact and then rebounds, resulting in the impact being absorbed substantially by the spring 6 without transmitting it to the workpiece. Thus, the torsion spring 6 acts to limit the maximum torque applicable to a workpiece to a value of torque equaling substantially the prestressed torque of the spring 6.

This invention covers a means for winding up or prestressing the torsion spring 6. A ring or adjustment member 10, shown in FIG. 1, fits over the front end portion of the torsion spring 6. The ring 10 is nonrotationally keyed to the front end portion of the torsion spring 6 by means of a series of interengaging straight splines 12 and grooves 13, as shown in FIG. 4. The splines 12 are integrally formed on the circumference of a portion of the spring 6 and the grooves 13 are cut in the interior of the ring 10. The splines 12 are substantially narrower than the grooves 13 to provide a sufficient amount of play or "lost motion" for the torsion spring 6 to deflect when the applied torque load exceeds its prestressing torque. The adjustment ring 10 is prevented from slipping from the torsion spring 6 and splines 12 by a lock ring 14 fitting in a groove on the end 8 of the torsion spring 6 immediately forward of the adjustment ring 10.

Both the forward portion of the tube 4 and the ring 10 carry respective sets of external gear teeth 16 and 17. The two sets of gear teeth 16 and 17 are surrounded and bridged by a flexible bushing 18 carrying internal gear teeth 19 meshing with the external gear teeth 16 and 17. The interior of the flexible bushing 18 is sufficiently larger than the external gear teeth 16 and 17 so that the bushing 18 can be formed into a noncircular bore with a portion of its internal teeth 19 being free of meshing engagement with the external teeth 16 and 17. A hollow sleeve 20 rotatively surrounds the flexible bushing 18. The sleeve 20 contains a generally elliptical or smooth noncircular bore 21 snugly and rotatively holding the flexible bushing 18 in a corresponding noncircular shape. In this shape, the meshing of the internal teeth 19 with the external gear teeth 16 and 17 is limited to two portions of the circumference of the bushing 18 which are located diametrically opposite each other, as shown in FIGS. 2 and 4. The sleeve 20 is rotatively retained on the tube 4 by a pin 23 fixed in the tube 4 and extending tangentially along an annular groove 24 formed around the tube 4, as shown in FIG. 1.

In general, the pitch of the external gear teeth 16 on the anvil tube 4 is slightly different from the pitch of the teeth 17 on the ring 10. For example, the external teeth 16 may comprise either two less or two more teeth than the gear teeth 17 on the ring 10. This difference in teeth can also be obtained by providing a difference in pitch diameter rather than pitch. Due to this small difference in pitch or pitch diameter, the rotation of the sleeve 20 on the flexible bushing 18 will progressively mesh the flexible bushing 18 with the external gear teeth 16 and 17 and will drive the ring 10 in rotation relative to the anvil tube 4. The driving of the ring 10 will be accomplished through a very high mechanical advantage capable of winding the torsion spring 6 to the desired value of prestressed load with the application of relatively small values of torque to rotate the sleeve 20.

FIG. 3 illustrates the pitch difference or tooth difference between the sets of teeth 16 and 17 and how the two sets of teeth 16 and 17 mesh with the internal gear teeth 19 on the flexible bushing 18. In general, the flexibility of the teeth and the bushing 18 is sufficient to allow the internal teeth 19 to mesh commonly with both sets of external gear teeth 16 and 17. This accommodation is overemphasized in FIG. 3 in order to illustrate the operation of the gear teeth in winding the torsion spring 6 as the sleeve 20 is rotated. This accommodation of the teeth can also be obtained by providing the meshing teeth with a small amount of backlash.

The flexible bushing 18 applies a balanced torque to the ring 10 due to the fact that the winding torque is applied at two diametrically opposite portions of the circumference of the ring 10. By balanced torque, it is meant that there are no substantial radial forces or side loads applied to the ring 10.

While only a single embodiment of the invention is described and illustrated in detail, this invention is not limited simply to the described embodiment, but contemplates other embodiments and variations which utilize the concepts and teachings of this invention.

I claim:

1. In a rotary impact tool including a rotary anvil and a rotary hammer adapted to periodically strike the anvil, a coupling for transmitting the rotary hammer impacts from the anvil to a workpiece and limiting the maximum torque of the transmitted impacts to a selected predetermined value of torque which can be readily adjusted, said coupling comprising:

a torsion spring having one end nonrotatably connected to said anvil and adapted to have its other end connected to a workpiece;

an adjustment member mounted on the other end of said torsion spring;

engagement means interconnecting said adjustment member to both said spring and to said anvil for locking said adjustment member against rotation relative to said spring and anvil in at least one rotary direction;

said engagement means including an indexing mechanism for winding said other end of said torsion spring relative to said anvil and including a set of external gear teeth connected to said anvil;

a set of external gear teeth connected to said adjustment member;

a flexible bushing containing internal gear teeth and surrounding both sets of external gear teeth to form two groups of interengaged gear teeth;

a hollow sleeve with a noncircular bore snugly enclosing and grasping said flexible bushing forcing said bushing to conform to said noncircular bore so that only a portion of said internal teeth on said bushing are engaged with said two sets of external gear teeth; and one group of interengaged gear teeth having a slightly different number of teeth relative to the other group of interengaged gear teeth so that rotation of said sleeve around said bushing will cause the winding of said other end of said torsion spring relative to said anvil.

2. In a rotary impact tool of the torque limiting type containing an anvil member and a torsion spring member having one end fixed to the anvil member and adapted to be prestressed, a coupling means interconnecting the other end of the torsion spring member to the anvil member, said coupling means comprising:

a tubular ring member nonrotatably keyed to both the spring member and the anvil member by two respective joints;

one of said joints including an indexing means for applying a torque load to wind said other end of said torsion spring relative to said anvil;

said indexing means including two sets of external gear teeth;

a flexible bushing containing a set of internal gear teeth surrounding and engaging both of said sets of external gear teeth to form two groups of interengaged gear teeth;

a noncircular sleeve surrounding said flexible bushing and deforming said bushing so that the meshing of said internal teeth with said external teeth is limited to a portion of the circumference of said bushing; and the number of teeth of one group of interengaged teeth being slightly different from the number of teeth of the other group of interengaged teeth so that the turning of said sleeve will cause one set of said external teeth to be rotated relative to the other set of said external gear teeth.

References Cited

UNITED STATES PATENTS

| | | | |
|---|---|---|---|
| 2,271,803 | 2/1942 | Pfeiffer et al. | 173—93.7 |
| 2,688,268 | 9/1954 | Lear | 173—93.7 |
| 2,914,978 | 12/1959 | Crick | 173—93.7 |
| 3,129,571 | 5/1964 | Reynolds | 64—27 |
| 3,272,035 | 9/1966 | Ekstrom et al. | 81—52.3 |

MYRON C. KRUSE, *Primary Examiner.*